(12) United States Patent  
Stiehler et al.

(10) Patent No.: US 9,840,916 B2  
(45) Date of Patent: Dec. 12, 2017

(54) TURBOMACHINE BLADE

(71) Applicant: MTU Aero Engines AG, Munich (DE)

(72) Inventors: Frank Stiehler, Bad Liebenwerda (DE); Andreas Hartung, Munich (DE)

(73) Assignee: MTU Aero Engines AG, Munich (DE)

( * ) Notice: Subject to any disclaimer, the term of this patent is extended or adjusted under 35 U.S.C. 154(b) by 508 days.

(21) Appl. No.: 14/283,973

(22) Filed: May 21, 2014

(65) Prior Publication Data

US 2014/0348639 A1     Nov. 27, 2014

(30) Foreign Application Priority Data

May 23, 2013   (EP) .................................. 13002704

(51) Int. Cl.
| | | |
|---|---|---|
| *F01D 5/16* | (2006.01) | |
| *F04D 29/66* | (2006.01) | |
| *F01D 5/26* | (2006.01) | |
| *F01D 25/06* | (2006.01) | |
| *F01D 5/18* | (2006.01) | |

(52) U.S. Cl.
CPC ............. *F01D 5/16* (2013.01); *F01D 5/18* (2013.01); *F01D 5/26* (2013.01); *F01D 25/06* (2013.01); *F04D 29/661* (2013.01); *Y02T 50/671* (2013.01)

(58) Field of Classification Search
CPC ..... F01D 5/16; F01D 5/18; F01D 5/26; F01D 25/06; F04D 29/661; Y02T 50/671
USPC .......................... 415/115, 116; 416/95, 96 R
See application file for complete search history.

(56) References Cited

U.S. PATENT DOCUMENTS

| | | |
|---|---|---|
| 1,833,754 A | 11/1931 | Paget |
| 2,310,412 A | 2/1943 | Fianders |
| 2,349,187 A | 5/1944 | Meyer |
| 2,462,961 A | 5/1949 | Harker |
| 2,828,941 A | 12/1952 | Foley |
| 2,646,920 A | 7/1953 | Butcher |
| 2,651,494 A | 9/1953 | Persson |
| 2,862,686 A | 12/1958 | Bartlett |
| 2,912,223 A | 11/1959 | Hull, Jr. |
| 2,920,868 A | 1/1960 | Ackerman |
| 2,930,581 A | 3/1960 | Klint |
| 2,990,156 A | 6/1961 | Marshall |
| 3,065,954 A | 11/1962 | Whitaker |
| 3,291,446 A | 12/1966 | Huebner, Jr. |
| 3,292,900 A | 12/1966 | Pettersen |
| 3,881,844 A | 5/1975 | Hennessey |
| 4,343,594 A | 8/1982 | Perry |
| 4,355,957 A | 10/1982 | Sifford |
| 4,441,859 A | 4/1984 | Sadler |
| 4,455,122 A | 6/1984 | Schwarzmann |
| 4,460,314 A | 7/1984 | Fuller |
| 4,480,959 A | 11/1984 | Bourguignon |

(Continued)

FOREIGN PATENT DOCUMENTS

| | | |
|---|---|---|
| DE | 102 02 995 | 8/2003 |
| DE | 10 2009 010 185 | 8/2010 |

(Continued)

*Primary Examiner* — Hoang Nguyen
(74) *Attorney, Agent, or Firm* — Davidson, Davidson & Kappel, LLC

(57) ABSTRACT

A blade (1) for a turbomachine, including a turbine blade (1.1) which has a channel (1.5), an impact chamber (2) having a constricted cross section being situated in the channel for the purpose of accommodating a single impulse body (3) is provided.

22 Claims, 1 Drawing Sheet

(56) References Cited

U.S. PATENT DOCUMENTS

| | | | |
|---|---|---|---|
| 4,482,297 A | 11/1984 | Mosimann | |
| 4,484,859 A | 11/1984 | Pask | |
| 4,650,167 A | 3/1987 | Steiner | |
| 4,936,749 A | 6/1990 | Arrao | |
| 5,205,713 A | 4/1993 | Szpunar | |
| 5,232,344 A | 8/1993 | El-Aini | |
| 5,498,137 A | 3/1996 | El-Aini | |
| 5,558,497 A * | 9/1996 | Kraft | F01D 5/26 416/500 |
| 5,599,170 A | 2/1997 | Marchi | |
| 5,820,348 A | 10/1998 | Fricke | |
| 5,924,845 A | 7/1999 | Bagley | |
| 6,155,789 A | 12/2000 | Mannava | |
| 6,827,551 B1 | 12/2004 | Duffy | |
| 7,125,225 B2 * | 10/2006 | Surace | F01D 5/16 416/224 |
| 7,128,536 B2 | 10/2006 | Williams | |
| 7,736,124 B2 | 6/2010 | Bauer | |
| 7,806,410 B2 | 10/2010 | El-Aini | |
| 7,955,054 B2 | 6/2011 | El-Aini | |
| 8,105,039 B1 | 1/2012 | El-Aini | |
| 8,596,980 B2 | 12/2013 | Miller | |
| 8,790,086 B2 | 7/2014 | Honkomp | |
| 8,858,159 B2 * | 10/2014 | Piggush | F01D 5/187 415/115 |
| 9,181,806 B2 * | 11/2015 | Propheter-Hinckley | F01D 5/16 |
| 9,249,668 B2 | 2/2016 | Fisk | |
| 9,371,733 B2 | 6/2016 | Hartung | |
| 2008/0145234 A1 * | 6/2008 | Lee | B22C 9/103 416/96 R |
| 2010/0034657 A1 | 2/2010 | Hunt | |
| 2011/0070085 A1 | 3/2011 | El-Aini | |
| 2011/0262274 A1 | 10/2011 | Boy | |
| 2013/0280083 A1 | 10/2013 | Hartung | |
| 2013/0294913 A1 | 11/2013 | Campbell | |
| 2014/0348639 A1 | 11/2014 | Stiehler | |
| 2016/0146041 A1 | 5/2016 | Hartung | |
| 2016/0215651 A1 | 7/2016 | Hartung | |
| 2016/0326881 A1 | 11/2016 | Hartung | |
| 2017/0044910 A1 | 2/2017 | Hartung | |
| 2017/0067487 A1 | 3/2017 | Hartung | |

FOREIGN PATENT DOCUMENTS

| | | |
|---|---|---|
| EP | 1980716 | 10/2008 |
| EP | 2 484 870 | 8/2012 |
| FR | 981599 | 5/1951 |
| FR | 1024218 | 3/1953 |
| FR | 2 522 364 | 9/1983 |
| GB | 2067675 | 7/1981 |

* cited by examiner

Fig. 1
Fig. 2
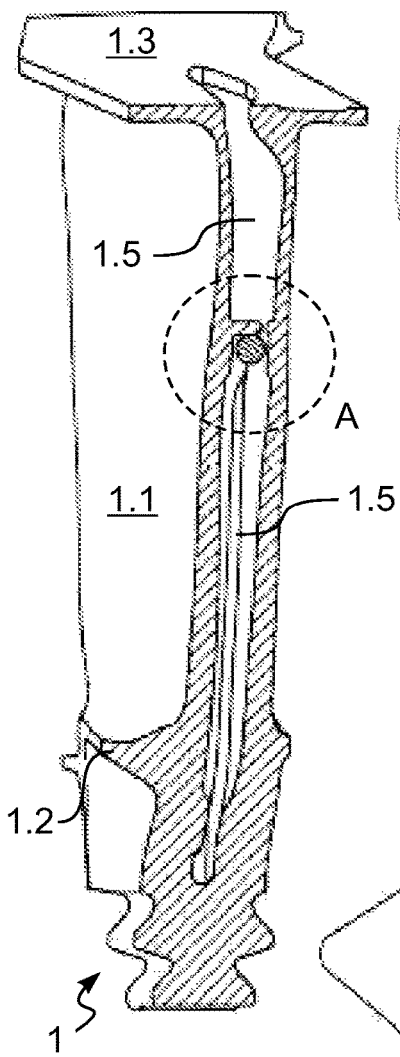
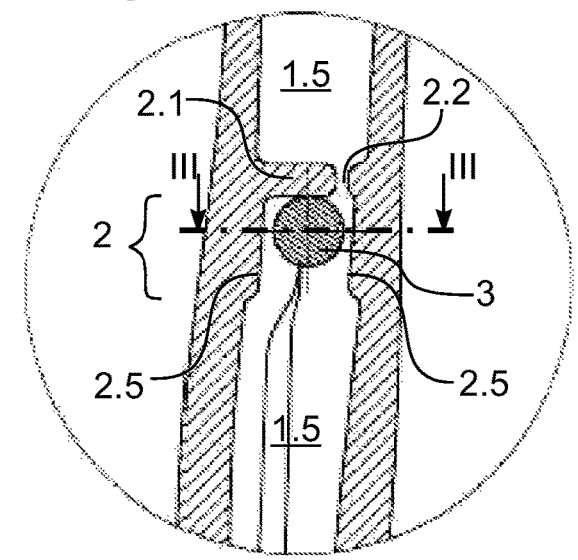
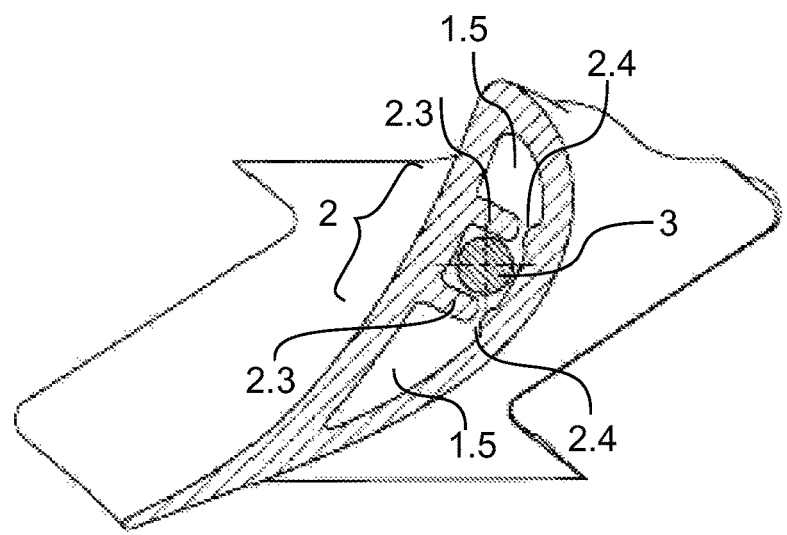
Fig. 3

TURBOMACHINE BLADE

This claims the benefit of European Patent Application EP 13002704.8, filed May 23, 2013 and hereby incorporated by reference herein.

The present invention relates to a blade for a turbomachine, to a turbomachine, in particular a gas turbine, in particular an aircraft engine gas turbine, having a blade of this type, as well as to a method for manufacturing a blade of this type.

In particular, guide and moving blades of aircraft engine gas turbines may be fluid-dynamically, thermally and/or structure-mechanically excited to vibrations. In particular, self-excited vibrations may occur.

BACKGROUND

It is known from DE 10 2009 010 185 A1 to provide multiple damping bodies in a cavity in a blade, which are able to move independently of each other relative to the walls of the cavity and relative to each other for the purpose of damping vibrations due to elastic impacts against each other and against the walls of the cavity.

SUMMARY OF THE INVENTION

It is an object of the present invention to provide an improved turbomachine.

The present invention provides a blade including a turbine blade which has a channel. The channel may be, in particular, a through-channel or a channel which is open on both sides and/or a channel which extends over or through the entire height of the turbine blade. The channel may be, in particular, a cooling channel, or it may be provided in such a way that a cooling medium, in particular air, flows through it during operation. Additionally or alternatively, a channel may be used to reduce the weight of the blade.

At least one, in particular a single, impact chamber having a constricted cross section is situated in the channel for accommodating a single impulse body.

According to one aspect of the present invention, in contrast to the spacious cavity filled with multiple bodies according to DE 10 2009 010 185 A1, well defined impact conditions are established with the present invention, and thus the effectiveness of the impact-based vibration damping may be improved. Due to the impact chamber, which is constricted with respect to the rest of the channel, in particular one or multiple preferred movements and thus preferred impact directions of the impulse body may be provided.

In one embodiment, the impact chamber may be delimited in the channel longitudinal or turbine blade height direction by a shoulder which projects into the channel and thus limits the movement of the impulse body in the channel longitudinal direction in a form-fitting manner. In one refinement, the impact chamber is delimited by a shoulder on only one side, so that the impulse body may move into and out of the impact chamber from the side opposite the shoulder, preferably due to the effect of gravitational and/or centrifugal force. Likewise, the impact chamber may be delimited on both sides by another shoulder in the channel longitudinal direction after accommodating the impulse body.

In one embodiment, the shoulder for delimiting the impact chamber in the channel longitudinal direction may be designed as a web which extends into the channel. The channel may advantageously widen again on the side of the web opposite the impact chamber. In one embodiment, the wall thickness of the web is a maximum of 50 percent of a maximum cross section of the impulse body, for example the diameter thereof. Due to a web, on the one hand, the channel may advantageously continue undisturbed downstream from the impact chamber, so that, for example, a cooling function is preferably influenced only a little. Additionally or alternatively, a thin-walled web, in particular, may improve the impact characteristic due to elastic deformation and, in particular, optimally reflect the impulse body.

In one embodiment, the impact chamber is delimited in the profile or chord direction on one side by one web or on both sides by two webs. In one embodiment, the turbine blade may be a hollow turbine blade having at least essentially a constant wall thickness along the blade contour, so that the channel cross section is at least essentially congruent to an outer contour of the turbine blade. In a channel of this type having a flow profile-like inner channel, in particular, a constricted impact chamber having advantageous reflection characteristics may be defined by one or two webs which extend transversely to the chord direction. In the present case, in particular in a manner according to usual practice, a chord direction is understood to be a direction along a skeleton line or center line of the turbine blade cross section.

One or two webs which delimit the impact chamber in the channel longitudinal direction, and/or one or two webs which delimit the impact chamber in the chord direction may each have an aperture. In this way, a fluid-permeable impact chamber may be provided, or a fluid flow, in particular a cooling medium flow, through the impact chamber may be facilitated or improved. An aperture of this type may be provided at a channel inner wall, so that the corresponding web extends from one channel inner wall to the opposite channel inner wall, not over the entire channel height. Likewise, two web parts may extended toward each other from opposite channel inner walls and be spaced a distance apart from the aperture, which is then provided in the channel interior and not at a channel inner wall.

Additionally or alternatively to a constriction or delimitation in the chord direction, the impact chamber may also be at least essentially constricted perpendicularly thereto or in the blade thickness direction, or the channel inner wall may be locally thickened at this point. For this purpose, a free channel height in the blade thickness direction and/or perpendicularly to the chord direction within the impact chamber may be reduced with respect to an upstream and/or downstream channel section in the channel longitudinal direction of the impact chamber.

In one embodiment, one or multiple side walls of the impact chamber may extend at least essentially in parallel to a turbine blade longitudinal axis or height, so that a striking impulse body is at least essentially reflected perpendicularly to the longitudinal axis. Likewise, one or multiple side walls of the impact chamber may also be inclined toward the longitudinal axis, in particular to improve an insertion and accommodation of the impulse body.

In one embodiment, one or multiple side walls of the impact chamber may extend at least essentially in or perpendicularly to the vibrational eigenmode direction of the blade. In the present case, in particular in a manner according to usual practice, a vibrational eigenmode direction of the blade is understood to be a deflection direction of a vibrational eigenmode of the blade, in particular a flexural or torsional eigenmode. The vibration-damping effect of the impacts of the reflected impulse body may be improved thereby.

In one embodiment, the impact chamber is situated in an area between 10 percent and 90 percent, in particular between 80 percent and 50 percent, of the blade height, measured from a blade root. Due to this arrangement in a central area, in particular a second highest quarter of the blade height, the vibration-damping effect of the impulse body may be improved.

In one embodiment, the impact chamber, together with the channel, is primarily shaped, in particular casted, whereby the manufacture of the channel and/or the insertion of the impulse body may be simplified.

In one embodiment, at least one, in particular exactly one or a single impulse body, is situated in the channel and accommodated, at least temporarily, in the impact chamber.

The blade may be, in particular, a moving blade, in particular a compressor stage and/or turbine stage. The impulse body may advantageously be driven into the impact chamber under the effect of centrifugal force. Likewise, the blade may be, in particular, a guide blade, in particular a compressor stage and/or turbine stage.

A blade according to the present invention may be used, in particular, as a guide or moving blade of a gas turbine, in particular an aircraft engine gas turbine.

According to one aspect of the present invention, the impact chamber, together with the through-channel, is primarily shaped, in particular casted, and the impulse body is subsequently inserted through the channel. The channel may subsequently be constricted or closed on the inlet side, for example by a rotor or housing fastening, an adjacent blade or a detachable or permanently, in particular integrally, fastened closure.

BRIEF DESCRIPTION OF THE DRAWINGS

Other advantages and features are derived from the subclaims and the exemplary embodiments. In partially schematic form:

FIG. 1 shows a longitudinal sectional view of a blade according to one embodiment of the present invention;

FIG. 2 shows an enlarged section of FIG. 1 in area A; and

FIG. 3 shows a cross section of the blade from FIG. 1 along line III-III in FIG. 2.

DETAILED DESCRIPTION

FIG. 1 shows a longitudinal sectional view of a blade 1 according to one embodiment of the present invention, including a turbine blade 1.1 which extends between a blade root 1.2 and a shroud 1.3.

Hollow turbine blade 1.1 has a continuous cooling channel 1.5, in which an impact chamber 2 having a constricted cross section is situated, in which a single spherical impulse body 3 is accommodated.

In the channel longitudinal direction (vertical direction in FIG. 1), impact chamber 2 is delimited by a web 2.1, which has an aperture 2.2 at the opposite channel inner wall (see FIG. 2).

In the chord direction (from the lower left to the upper right in FIG. 3), impact chamber 2 is delimited by two webs 2.3, each of which has a first part, which extends into the channel from one channel inner wall, and a second part, which extends into the channel from the opposite channel inner wall and is spaced a distance apart from the first part by an aperture 2.4.

In the blade thickness direction (horizontal direction in FIG. 2; from the upper left to the lower right in FIG. 3), the channel height in impact chamber 2 is reduced with respect to an upstream and/or downstream channel section 1.5 in the channel longitudinal direction of the impact chamber, or channel inner wall 2.5 is locally thickened at this point.

The side walls of impact chamber 2 defined by these thickened areas 2.5 and webs 2.3 extend in parallel to the turbine blade axis, which is vertical in FIG. 2, i.e., it is perpendicular or parallel to the image plane in FIG. 2.

The side walls of impact chamber 2 defined by webs 2.3 extend in a first flexural vibrational eigenmode direction (horizontal direction in FIG. 2).

The impact chamber is situated in an area between 80 percent and 50 percent of the turbine blade height (vertically in FIG. 1), measured from blade root 1.2.

Together with channel 1.5, the impact chamber is primarily shaped, in particular casted. Impulse body 3 is subsequently inserted through channel 1.5, which is designed as a cooling channel.

LIST OF REFERENCE NUMERALS

1 Blade
1.1 Turbine blade
1.2 Blade root
1.3 Shroud
1.5 Cooling channel
2 Impact chamber
2.1 Web
2.2 Aperture
2.3 Web
2.4 Aperture
2.5 Thickened area/channel height reduction
3 Impulse body

What is claimed is:

1. A blade for a turbomachine, comprising:
a turbine blade having a channel extending over an entire height of the turbine blade in a channel longitudinal direction, an impact chamber having a constricted cross section being situated in the channel and the turbine blade having solely a single impulse body in the impact chamber, a channel height, running in a thickness direction of the turbine blade, being reduced with respect to an upstream and downstream channel section in the channel longitudinal direction of the impact chamber, the impact chamber being situated in an area between 10 percent and 90 percent of the blade height, measured from a blade root.

2. The blade as recited in claim 1 wherein the impact chamber is delimited in the channel longitudinal direction by at least one shoulder for limiting a movement of the impulse body in the channel longitudinal direction in a form-fitting manner.

3. The blade as recited in claim 2 wherein the shoulder is a web.

4. The blade as recited in claim 1 wherein the impact chamber is delimited by at least one web in a chord direction of the turbine blade, the chord direction being a direction along a skeleton line or center line of the turbine blade cross section, the at least one web extending into the channel from one channel inner wall.

5. The blade as recited in claim 4 wherein the web has an aperture for the purpose of facilitating a fluid flow through the impact chamber.

6. The blade as recited in claim 3 wherein the web has an aperture for the purpose of facilitating a fluid flow through the impact chamber.

7. The blade as recited in claim 5 wherein the at least one web includes two webs.

8. The blade as recited in claim 1 wherein the impulse body has a spherical design.

9. The blade as recited in claim 1 wherein at least one side wall of the impact chamber extends parallel to a blade longitudinal axis of the turbine blade.

10. The blade as recited in claim 1 wherein at least one side wall of the impact chamber extends in or perpendicularly to a vibrational eigenmode direction of the blade, the vibrational eigenmode direction of the blade being a deflection direction of a vibrational eigenmode of the blade.

11. The blade as recited in claim 10 wherein the eigenmode is a flexural or torsional eigenmode.

12. The blade as recited in claim 1 wherein the impact chamber is situated in an area between 80 percent and 50 percent of the blade height.

13. The blade as in claim 12 wherein the impact chamber is situated in a second-highest quarter of the blade height measured from a blade root.

14. The blade as recited in claim 1 wherein the impact chamber, together with the channel, is primarily shaped.

15. The blade as recited in claim 1 wherein the impulse body is situated in the channel.

16. The blade as recited in claim 1 wherein the blade is a moving blade.

17. The blade as recited in claim 1 wherein the blade is a guide blade.

18. The blade as recited in claim 1 wherein the channel is a cooling channel.

19. A turbomachine comprising at least one compressor stage and/or turbine stage including at least one blade as recited in claim 1.

20. A gas turbine comprising the turbomachine as recited in claim 19.

21. An aircraft engine gas turbine comprising the gas turbine as recited in claim 20.

22. The blade as recited in claim 1 wherein the blade the impact chamber is a sole single impact chamber in the blade.

* * * * *